(12) United States Patent
Aluru

(10) Patent No.: US 11,064,131 B1
(45) Date of Patent: Jul. 13, 2021

(54) SYSTEMS AND METHODS FOR PROACTIVE FLICKER MITIGATION

(71) Applicant: GM GLOBAL TECHNOLOGY OPERATIONS LLC, Detroit, MI (US)

(72) Inventor: Sai Vishnu Aluru, Commerce, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/033,134

(22) Filed: Sep. 25, 2020

(51) Int. Cl.
*H04N 5/235* (2006.01)
*B60S 1/04* (2006.01)
*G06K 9/00* (2006.01)

(52) U.S. Cl.
CPC .............. *H04N 5/2353* (2013.01); *B60S 1/04* (2013.01); *G06K 9/00791* (2013.01); *H04N 5/2351* (2013.01)

(58) Field of Classification Search
CPC ...... H04N 5/2353; H04N 5/2351; B60S 1/04; G06K 9/00791
USPC ........................................................ 348/148
See application file for complete search history.

(56) References Cited

U.S. PATENT DOCUMENTS

| 2015/0169082 A1* | 6/2015 | Li | G06F 3/0304 345/157 |
| 2021/0012521 A1* | 1/2021 | Wendel | G06K 9/3241 |

* cited by examiner

*Primary Examiner* — Allen C Wong
(74) *Attorney, Agent, or Firm* — Lorenz & Kopf LLP

(57) ABSTRACT

Vision sensing systems and methods that mitigate flicker and associated artifacts. The system includes a camera module that controls operation of a camera onboard a mobile platform and generates camera data therefrom, wherein the camera data comprises a sequential plurality of frames An exposure lock module is configured to: communicate with the camera module to receive the camera data; analyze the camera data to identify a blackout; utilize machine learning to quantify a frequency of blackouts in the camera data; generate a vision sensor command for anticipating future blackouts as a function of the frequency of blackouts; and supply the vision sensor command to the camera module. An enhanced exposure control module utilizes the vision sensor command to mitigate flicker and associated artifacts, thereby providing image stabilized enhanced frames.

20 Claims, 4 Drawing Sheets

SYSTEMS AND METHODS FOR PROACTIVE FLICKER MITIGATION

TECHNICAL FIELD

The present disclosure generally relates to vision sensor systems for mobile platforms, and more particularly relates to vision sensor systems and methods that proactively mitigate flicker in applications in which the flicker is periodic.

Vision sensing systems for vehicles generally employ cameras that are configured to detect/sense light emitted by objects external to the vehicle and generate camera data therefrom. In various scenarios, a flicker can be introduced into the camera data. In some flicker scenarios, the flicker is periodic, such as, when windshield wipers are operated in a vehicle. In this scenario, the camera is initially detecting ambient light and the camera circuitry is initially controlling the camera with an appropriate exposure value for the ambient light. When the wiper blade occludes the aperture of the camera, it causes an abrupt blackout. In response to the blackout, the camera circuitry may maximize the exposure value. When viewing the camera data, this blackout may be experienced as a technical problem of a periodic flicker.

When the occlusion/blackout ends, the ambient light returns through the aperture of the camera, and the camera circuitry takes a finite and measurable amount of time to react to the detected return of the ambient light. During this reaction time, the camera circuitry returns the exposure value from the maximum exposure value to the appropriate ambient light exposure value. When viewing the camera data, this reaction time may be experienced as a technical problem of artifacts.

Flicker and artifacts can introduce further technical problems such as glare and increased latency of object detection by applications that rely on the camera data for object detection. Therefore, technologically improved vison sensing systems and methods that mitigate periodic flicker and artifacts are desirable.

The following disclosure provides a technological solution to the above technical problems, in addition to addressing related issues. Furthermore, other desirable features and characteristics of the system and method will become apparent from the subsequent detailed description and the appended claims, taken in conjunction with the accompanying drawings and the preceding background.

SUMMARY

An embodiment of a vision sensing system on a mobile platform is provided. The vision sensing system includes: a camera module configured to control operation of a camera onboard the mobile platform and generate camera data therefrom, wherein the camera data includes a sequential plurality of frames; an exposure lock module configured to: communicate with the camera module to receive the camera data; analyze the camera data to identify a blackout; utilize machine learning to quantify a frequency of blackouts in the camera data; generate a vision sensor command for anticipating future blackouts as a function of the frequency of blackouts; and supply the vision sensor command to the camera module.

In an embodiment, the camera data further comprises, for each frame, a respective exposure value that is a function of sensed light by the camera, and wherein the exposure lock module is further configured to: identify the blackout as a frame in the camera data in which the respective exposure value is a maximum value; and cache a preprogrammed number of frames of the camera data to utilize the machine learning to quantify the frequency of blackouts on the camera data.

In an embodiment, the camera module is further configured to: (a) predict a blackout, responsive to the vision sensor command; and (b) hold, for the predicted blackout, its respective exposure value to an exposure value of an immediately preceding frame.

In an embodiment, the camera module is further configured to: generate enhanced frame data by repeating (a) and (b); and supply the enhanced frame data to a mobile platform module that is external to the vision sensing system.

In an embodiment, the mobile platform module that is external to the vision sensing system is one of an onboard object recognition module or infotainment module.

In an embodiment, the camera data further includes, for each frame, a respective exposure value that is a function of sensed light by the camera, and wherein the exposure lock module is further configured to: identify the blackout as a frame in which an exposure is a maximum value; and utilize a machine learning module to: cache a predetermined number of frames of camera data; determine a current frequency of blackouts in the cached camera data; compare the current frequency of blackouts with a previously determined frequency of blackouts to obtain an error between them; and repeat the caching, determining, and comparing until the error is less than a preprogrammed error threshold; and supply the frequency of blackouts only when the error is less than the preprogrammed error threshold.

In an embodiment, the exposure lock module is further configured to: receive a wiper control signal from a wiper controller onboard the mobile platform; and generate the vision sensor command further as a function of the wiper control signal.

Also provided is a method for vision sensing on a mobile platform, including: at camera circuitry onboard the mobile platform, controlling operation of a camera onboard the mobile platform and generating camera data therefrom, wherein the camera data comprises a sequential plurality of frames; at exposure lock circuitry, communicating with the camera circuitry to receive the camera data; analyzing the camera data to identify a blackout; employing machine learning to quantify a frequency of blackouts in the camera data; generating a vision sensor command for anticipating future blackouts as a function of the frequency of blackouts; and supplying the vision sensor command to the camera module.

In an embodiment, the camera data further includes, for each frame, a respective exposure value that is a function of sensed light by the camera, and further comprising, at the exposure lock circuitry: identifying the blackout as a frame in the camera data in which the respective exposure value is a maximum value; and caching a preprogrammed number of frames of the camera data to utilize the machine learning to quantify the frequency of blackouts on the camera data.

In an embodiment, including, at the camera circuitry: (a) predicting a blackout, responsive to the vision sensor command; and (b) holding, for the predicted blackout, its respective exposure value to an exposure value of an immediately preceding frame.

In an embodiment, including, at the camera circuitry: generating enhanced frame data by repeating (a) and (b); and supplying the enhanced frame data to a mobile platform module that is external to the vision sensing system.

In an embodiment, the mobile platform module that is external to the vision sensing system is one of an onboard object recognition module or infotainment module.

In an embodiment, the camera data further includes, for each frame, a respective exposure value that is a function of sensed light by the camera, and further including, at the exposure lock circuitry: identifying the blackout as a frame in which an exposure is a maximum value; and employing a machine learning module to: cache a predetermined number of frames of camera data; determine a current frequency of blackouts in the cached camera data; compare the current frequency of blackouts with a previously determined frequency of blackouts to obtain an error between them; and repeat the caching, determining, and comparing until the error is less than a preprogrammed error threshold; and supplying the frequency of blackouts only when the error is less than the preprogrammed error threshold.

In an embodiment, the exposure lock module is further configured to: receive a wiper control signal from a wiper controller onboard the mobile platform; determine a periodicity of the wiper control signal; confirm the frequency of blackouts based on the periodicity of the wiper control signal; and generate the vision sensor command further as a function of the wiper control signal.

Another vision sensing system for a mobile platform is provided, including: a camera circuit comprising a camera and configured to sense light emitted by objects external to the vehicle and generate camera data therefrom, the camera data including a sequential plurality of frames; and a processor operationally coupled to the camera circuit and configured by programming instructions to: receive the camera data; utilize machine learning to quantify a frequency of blackouts in the camera data; generate a vision sensor command for anticipating future blackouts as a function of the frequency of blackouts; and supply the vision sensor command to the camera module.

In an embodiment, the processor is further configured to: (a) predict a blackout, responsive to the vision sensor command; and (b) perform exposure value control by causing the camera circuit to hold, for a duration of the predicted blackout, a respective exposure value to an exposure value of an immediately preceding frame.

In an embodiment, the processor is further configured to: cause the camera circuit to generate enhanced frame data by repeating (a) and (b); and supply the enhanced frame data to a mobile platform module that is external to the vision sensing system.

In an embodiment, the camera data further includes, for each frame, a respective exposure value that is a function of sensed light by the camera, and wherein the processor is further configured to: identify the blackout as a frame in which an exposure is a maximum value; and utilize a machine learning module to: cache a predetermined number of frames of camera data; determine a current frequency of blackouts in the cached camera data; compare the current frequency of blackouts with a previously determined frequency of blackouts to obtain an error between them; and repeat the caching, determining, and comparing until the error is less than a preprogrammed error threshold; and supply the frequency of blackouts only when the error is less than the preprogrammed error threshold.

In an embodiment, the processor is further configured to: receive a wiper control signal from a wiper controller onboard the mobile platform; determine a periodicity of the wiper control signal; confirm the frequency of blackouts based on the periodicity of the wiper control signal; and generate the vision sensor command further as a function of the wiper control signal.

In an embodiment, the mobile platform module that is external to the vision sensing system is one of an onboard object recognition module or infotainment module.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
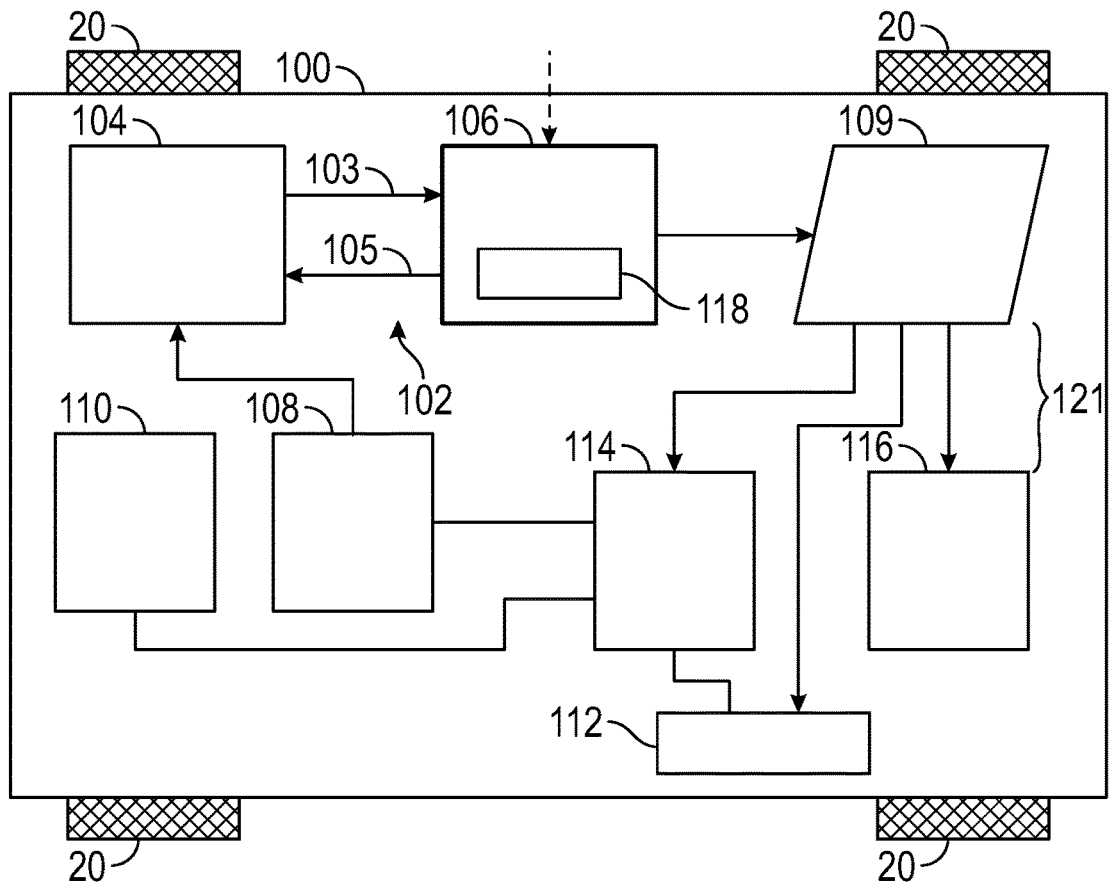
FIG. 1 is a schematic diagram illustrating a vision sensing system implemented onboard a vehicle, in accordance with various embodiments.

The following detailed description is merely exemplary in nature and is not intended to limit the application and uses. Furthermore, there is no intention to be bound by any expressed or implied theory presented in the preceding technical field, background, summary, or the following detailed description.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices.

As used herein, the term "module" may refer to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the functionality attributed to the module.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As mentioned, in some flicker scenarios, such as, when windshield wipers are operated in a vehicle flicker and associated artifacts are periodic. In this scenario, the camera is initially detecting ambient light and the camera circuitry is initially controlling the camera with an appropriate exposure value for the ambient light. When the wiper blade occludes the aperture of the camera, it causes an abrupt blackout of ambient light and the camera circuitry may respond by maximizing the exposure value. When the occlusion/blackout ends, the ambient light returns through the aperture of the camera, and the camera circuitry takes a finite and measurable amount of time to react to the detected return of the ambient light; during this reaction time, the camera circuitry returns the exposure value from the maximum exposure value to the appropriate ambient light exposure value. Flicker and artifacts can introduce further technical problems such as glare and increased latency of object detection by applications that rely on the camera data for object detection.

Exemplary embodiments of the vision sensing system provide a technological solution to these problems by quantifying the frequency of the blackouts (and hence, the periodicity), embodied in a vision sensor command, and using that vision sensor command to predict blackouts, both in frequency and duration. By predicting blackouts, exemplary embodiments can proactively hold or lock the exposure values steady for a calibratable duration of time of the blackout (e.g., hold the exposure value during the blackout to the exposure value of an immediately previous frame, which is an appropriate exposure value for ambient light). By predicting each blackout of a plurality of periodic blackouts, embodiments can perform this hold of the exposure value of the previous frame, to thereby mitigate flicker and associated artifacts. Additionally, exemplary embodiments can supply, as output, enhanced frames, in which exposure control circuitry has utilized the vision sensor command as described. The enhanced frames exhibit mitigated flicker and artifacts, as a function of the vision sensing command. Applications and modules that rely on camera data can receive the enhanced frames and may experience reduced latency of object detection when using the enhanced frames. The technologically enhanced vision sensing system and method are described in more detail in connection with the figures below.

FIG. 1 depicts an example mobile platform. The example mobile platform is a vehicle 100 that is capable of movement and carrying passengers from one location to another. The vehicle 100 is depicted in the illustrated embodiment as a passenger car, but other vehicle types, including motorcycles, taxi cabs, vehicle fleets, buses, sedans, wagons, trucks, sport utility vehicles, other automobiles, recreational vehicles (RVs), locomotives, and other vehicles may also be used. As is generally understood, the vehicle 100 may embody a body, chassis, and wheels 20, each of which are rotationally coupled to the chassis near a respective corner of the body. The vehicle 100 is depicted with four wheels 20, but the number of wheels 20 may vary in other embodiments. The vehicle 100 may be autonomous or semi-autonomous. The vehicle 100 includes a collective functional block, drive systems 110, which generally includes known vehicle systems for vehicle operation, such as, a propulsion system, a transmission system, a steering system, actuators for the wheels, and a brake system, and generates a variety of signals, including vehicle speed and vehicle acceleration.

The vehicle 100 includes a vision sensing system, shown generally as system 102, which is communicatively coupled to the drive systems 110. The example vehicle 100 further includes a number of additional components that are also communicatively coupled to the system 102. Non-limiting examples of the components include a camera 118, a central platform controller 114, a wiper controller 108, one or more onboard object recognition modules 116, and infotainment systems 112. The functions and operations of each of these components are described in more detail below.

The camera 118 may be mounted, via camera circuitry 106, on the mobile platform. The associated camera 118 may refer to one or more optical cameras (e.g., forward facing, 360-degree, rear-facing, side-facing, stereo, etc.), thermal (e.g., infrared) cameras, and the like. The camera circuitry 106 may include or be part of a front collision module (FCM), augmented reality camera (ARC), or the like. In various embodiments, the camera 118 can obtain and process information in 360 degrees. In operation, the camera 118 senses light levels, luminance, edges, contrast, saturation of light, etc., and the camera circuitry 106 operates the camera 118 and generates camera data based thereon. Non-limiting examples of characteristics that may be embodied in the camera data include panoramic view, amount of light, edges, exposure values, contrast, saturation, etc.

In some embodiments, the camera circuitry 106 may have its own control circuit, such as a processor. In other embodiments, the processor 50 (FIG. 2) commands the camera circuitry 106. In some embodiments, the processor 50 causes individual cameras 118 in the camera circuitry 106 to articulate to obtain respective images. Each camera 118 of the one or more cameras 118 has a respective frame rate and provides its respective camera data to the processor 50. In operation, a dedicated exposure control circuit 120 (FIG. 2) may receive vision sensor command 103 (described in more detail below) and proactively control exposure values in specific frames of camera data based thereon, resulting in the enhanced frames 109.

During an initialization step, the processor 50 may assess, and/or program, with preprogrammed settings, parameters such as: a number of available cameras 118, their frame rates, the portion of the external world that the camera data represents, and the like. In operation of a mobile platform 100, or other suitable environment, the enhanced frames 109, which may be color images, may be supplied as individual signals, or on a data bus 121, to the on-board circuits and systems, such as the central platform controller 114, infotainment systems 112, onboard object recognition modules 116, and drive systems 110.

The central platform controller 114 may receive and integrate communications from a variety of modules and systems known to be present in the above described vehicle 100. Accordingly, inputs provided by the central platform controller 114 to the system 102 may include user inputs, mobile applications and systems, off-board communications (e.g., via a transceiver), a geographic positioning system (GPS), and infotainment systems 112. The central platform controller 114 may also be in bidirectional communication with onboard object recognition modules 116. The central platform controller 114 communicates user and operational input to the drive systems 110 and other on-board systems such as the wiper controller 108 and the infotainment system 112.

Figure 5:
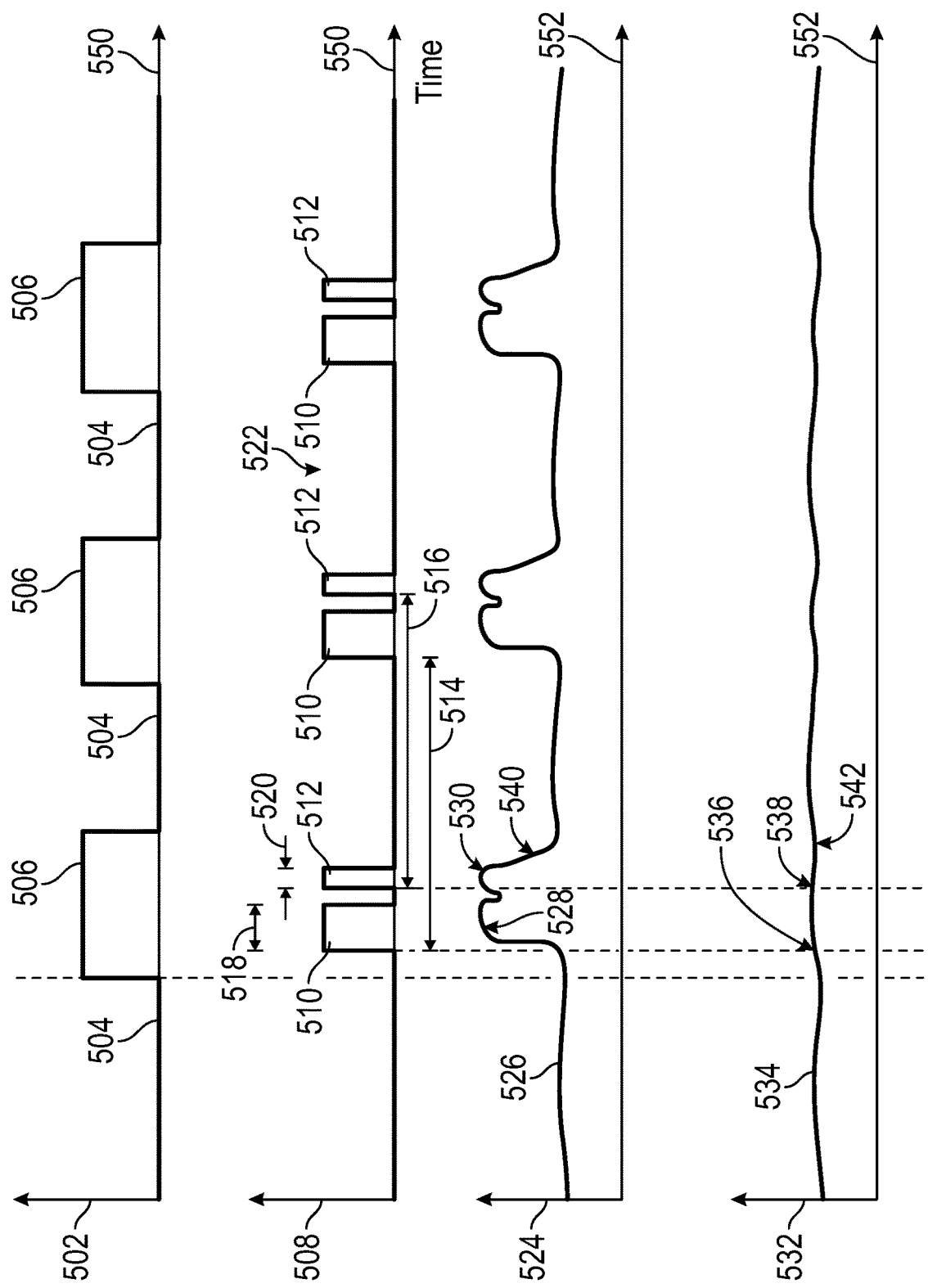
FIG. 5 provides several graphs to depict concepts described.

The wiper controller 108 controls the windshield wipers on the vehicle 100. Output from the wiper controller may include a wiper control signal (illustrated in FIG. 5 as wiper frequency, which is generally periodic), and a wiper activation signal (e.g. "on" or "off"). In some embodiments, the wiper control signal may integrate more than one periodic signal, as shown in FIGS. 5, 510 and 512). The infotainment system 112 may include display units, user input devices, speakers, and the like.

In an exemplary embodiment, an onboard object recognition module 116 is a machine vision system or other application that embodies at least an object recognition algorithm and that makes determinations about the external environment of the vehicle 100 based on camera data. More specifically, the onboard object recognition module 116 makes operational decisions for the vehicle 100 without reliance on human input. An example of an operational decision includes traction control, braking, bringing the vehicle to a stop, changing lanes, changing lighting levels in headlights, and the like.

Figure 2:
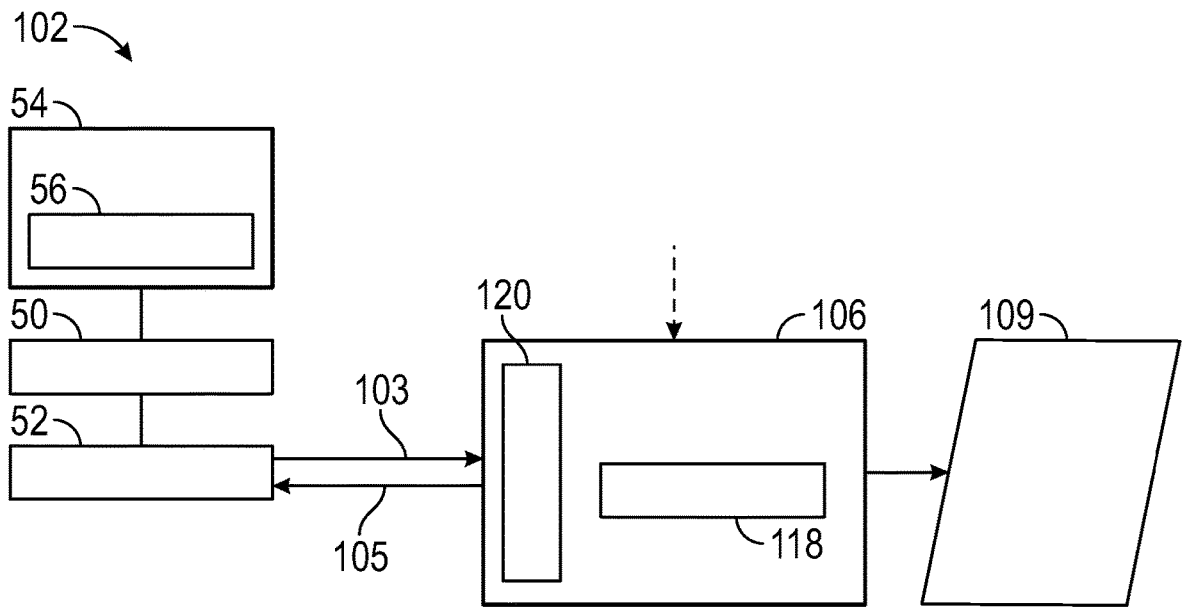
FIG. 2. is a block diagram of the electronic circuitry of the vision sensing system, in accordance with various embodiments.

With reference to FIGS. 1-2, in various embodiments, the vision sensing system 102 may be described in terms of exposure lock circuitry 104 and camera circuitry 106 for controlling the camera 118. In various embodiments, the exposure lock circuitry 104 and camera circuitry 106 are integrated. The exposure lock circuitry 104 generates a novel vision sensor command 103 (described in more detail below) for use by the camera circuitry 106. In various embodiments, the camera circuitry 106 includes expected circuitry for operating the camera 118 and adds a technological improvement, indicated as the aforementioned exposure control circuit 120, that delivers a technologically improved camera data output as a function of the vision sensor command 103. In other embodiments, the exposure control circuit 120 may be part of the exposure lock circuitry 104. As mentioned, the technologically improved camera data output is referred to herein as enhanced frames 109, as distinguished from camera data 105.

In an embodiment, the vision sensing system 102 includes a processor 50 that is operationally coupled to a memory 54, input/output (I/O 52) circuitry, and camera circuitry 106 for controlling the camera 118. The program 56, stored in memory 54, when executed by the processor 50, causes the processor 50 to generate the vision sensor command 103 for the camera circuitry 106. In various embodiments, the program 56, stored in memory 54, when executed by the processor 50, causes the processor 50 to perform exposure value control (e.g., via the camera circuitry 106 or the exposure control circuit 120) to generate therefrom enhanced frames 109. The camera circuitry 106 operates the camera 118 to generate camera data 105 from the detected light and edges. In some embodiments, the camera circuitry 106 operation is under the direction of the processor 50.

As used herein, the processor 50 facilitates communications and/or interaction between the components of the system 102 and performs additional processes, tasks and/or functions to support operations attributed to the system 102, as described herein. Depending on the embodiment, the processor 50 may be implemented or realized with a general purpose processor (shared, dedicated, or group) controller, microprocessor, or microcontroller, and memory that executes one or more software or firmware programs; a content addressable memory; a digital signal processor; an application specific integrated circuit (ASIC), a field programmable gate array (FPGA); any suitable programmable logic device; combinational logic circuit including discrete gates or transistor logic; discrete hardware components and memory devices; and/or any combination thereof, designed to perform the functions described herein.

In various embodiments, as shown in FIG. 2, the system 102 is realized as an enhanced computer system, comprising computer readable storage device or media, memory 54, for storage of instructions, algorithms, and/or programs, such as program 56 and a plurality of preprogrammed thresholds and parameters, the processor 50 to execute the program 56, and input/output interface (I/O) 52. The computer readable storage device or media, memory 54, may include volatile and nonvolatile storage in read-only memory (ROM), random-access memory (RAM), and keep-alive memory (KAM), for example. KAM is a persistent or non-volatile memory that may be used to store various operating variables while the processor 50 is powered down. The memory 54 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the processor 50 in controlling the vehicle 100. In various embodiments, processor 50 is configured to implement the system 102. The memory 54 may also be utilized by the processor 50 to cache multiple frames of camera data at a time, to store results of comparisons and analyses, and the like. Information in the memory 54 may be organized and/or imported from an external source during an initialization or installment operation in a method; it may also be programmed via a user input device.

The input/output interface (I/O) 52 may be operationally coupled to the processor 50 via a bus and enables intra-system 102 communication as well as extra-system 102 communication. The input/output interface (I/O) 52 may include one or more wired and/or wireless network interfaces and can be implemented using any suitable method and apparatus. In various embodiments, the input/output interface (I/O) 52 includes the hardware and software to support one or more communication protocols for wireless communication between the processor 50 and external sources, such as satellites, the cloud, communication towers and ground stations. In various embodiments, the input/output interface (I/O) 52 supports communication with technicians, and/or one or more storage interfaces for direct connection to storage apparatuses.

During operation of the system 102, the processor 50 loads and executes one or more algorithms, instructions, and rules embodied as program 56, and, as such, controls the general operation of the system 102. The processor 50 is configured to receive the camera data 105 from the camera circuitry 106. Depending on the embodiment of the system 102, it may perform operations in accordance with an algorithm, perform operations in accordance with state machine logic, perform operations in accordance with logic in a programmable logic array, or the like.

Figure 3:
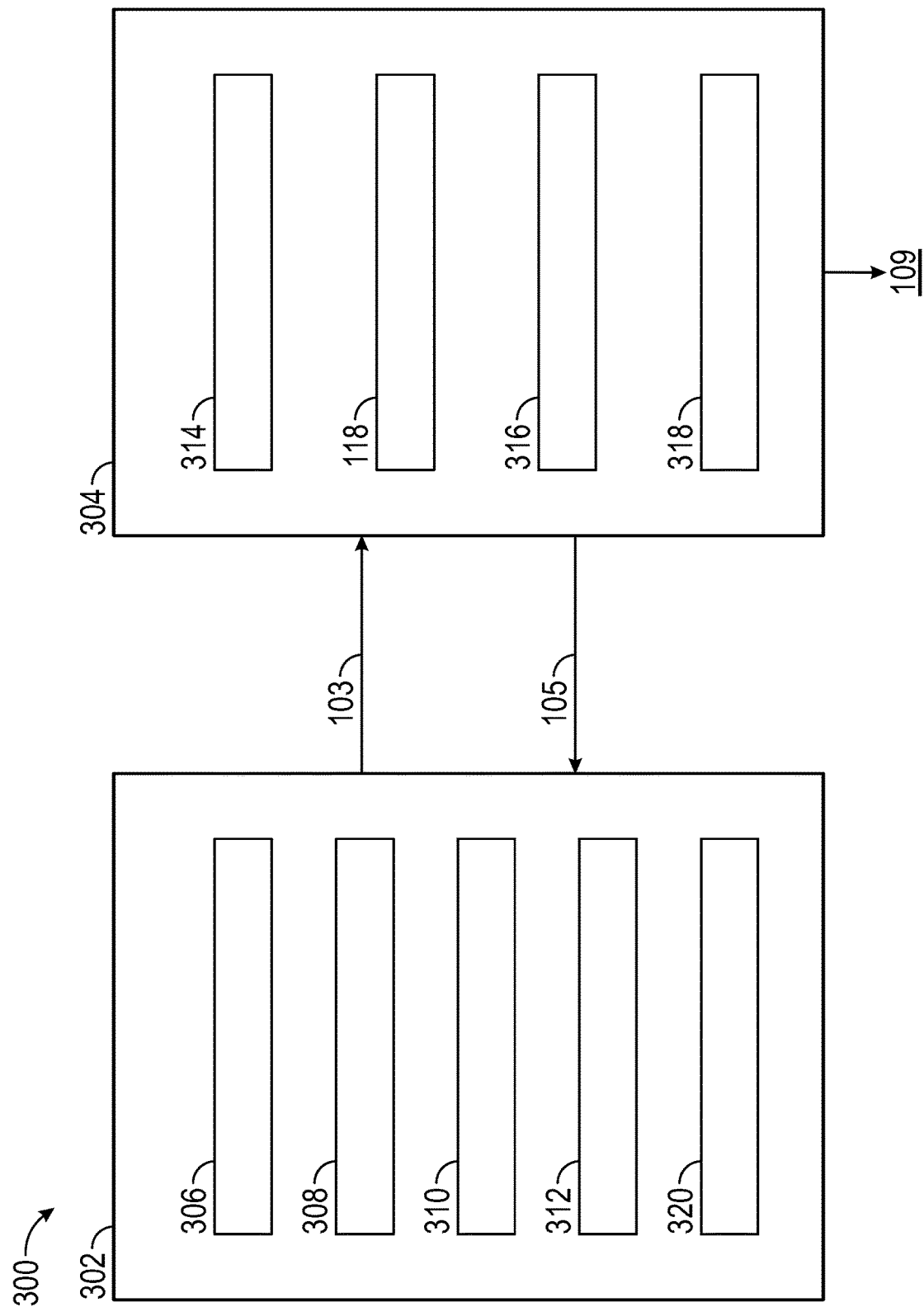
FIG. 3 is an architectural block diagram of one or more application modules that may be operating in the vision sensing system.

While the exemplary embodiment of the system 102 is described in the context of a fully functioning enhanced computer system, those skilled in the art will recognize that the mechanisms of the present disclosure are capable of being distributed as a program product including program 56 and the predefined parameters. Turning now to FIG. 3, such a program product may comprise an arrangement of instructions organized as multiple interdependent program code modules 300, each configured to achieve a separate process and/or perform a separate algorithmic operation, arranged to manage data flow through the system 102. The program code modules 300 may each comprise an ordered listing of executable instructions for implementing logical functions for the processes performed by the system 102. The instructions in the program code modules 300, when executed by a processor (e.g. processor 50), cause the processor to receive and process signals, and perform logic, calculations, methods and/or algorithms as described herein for automatically and in real-time generating vision sensor commands for the camera circuitry 106, and generating enhanced frames 109.

Once developed, the program code modules 300 constituting a program product may be stored and distributed individually, or together, using one or more types of non-transitory computer-readable signal bearing media may be used to store and distribute the instructions, such as a non-transitory computer readable medium. Such a program product may take a variety of forms, and the present disclosure applies equally regardless of the type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized as memory and as program product time-based viewing of clearance requests in certain embodiments.

With continued reference to FIG. 3, an exposure lock module 302 may provide the vision sensor command 103 to the camera module 304 and receive camera data 105 from the camera module 304. The exposure lock module may comprise additional modules, such as blackout detection module 306, machine learning module 308, command generation module 310, and command driver module 312. The functionality attributed to each of these modules in the exposure lock module 302 is now described.

The exposure lock module 302 is configured to communicate with the camera module to receive the camera data; in various embodiments, this may include performing a synchronization routine. The exposure lock module 302 is configured to analyze the camera data to identify a blackout (e.g., as configured by a blackout detection module 306). A blackout is identified as a frame in the camera data 105 in which the respective exposure value is a maximum value. The exposure lock module 302 is also configured to utilize machine learning (e.g., as configured by a machine learning module 308) to quantify a frequency of blackouts in the camera data.

In various embodiments, the machine learning module 308 may cache a preprogrammed number of frames of the camera data 105 to utilize the machine learning to quantify the frequency of blackouts in the camera data. As used herein, cache means store in scratch memory, such as a portion of memory 54. The cached frames may be analyzed to determine a current frequency of the blackouts in the cached camera data. Multiple cycles of caching allow for analyzing image statistics to identify the frequency (and hence periodicity) of blackouts, as well as calibrating a duration of time of the blackouts.

In an example, the preprogrammed number is ten, and in a first pass of caching ten frames, the exposure lock module 302 identifies frame 5 and frame 10 are blackouts, the current frequency may be 2/10. In a next set of cached frames, frames 3, 7, and 10 may be blackouts, and the current frequency may then be 3/10. To quantify the frequency of blackouts in the camera data, the machine learning module 308 may compare the current frequency with a previously determined frequency to obtain an error between them (e.g., error is 1/10); The machine learning module 308 may adjust the current frequency as a function of the error, and repeat the caching, determining, and comparing until the error is less than a preprogrammed error threshold. In various embodiments, once the error is less than the preprogrammed error threshold, the machine learning module 308 may set the frequency of blackouts to be the most recent current frequency. The quantified frequency of blackouts is an output of the machine learning module 308. In various embodiments, the machine learning module 308 may supply the frequency of blackouts only when the error is less than the preprogrammed error threshold. As may be appreciated, this is a simplified example, and in other embodiments, other machine learning methodologies may be employed to quantify the frequency of blackouts in the camera data 105.

In various embodiments, a command generation module 310 may take the frequency of blackouts and generate the vision sensor command 103 for anticipating future blackouts as a function of the frequency of blackouts. In summary, converting between frequency and periodicity, the provided embodiments identify a periodicity of the blackouts (e.g., see FIG. 5, described in more detail below), and the vision sensor command 103 is a function of a detected and determined frequency of blackouts during an application that has identifiably periodic blackouts; therefore, the vision sensor command 103 can be used to proactively predict blackouts in the application, as a function of the periodicity of the blackouts.

In various embodiments, a wiper control modification module 320 may receive a wiper control signal from a wiper controller 108 onboard the mobile platform. In various embodiments, the wiper control signal has its own periodicity, and the wiper control modification module 320 may determine the periodicity of the wiper control signal and multiplex the wiper control signal frequency, and/or its activation signal, with the output from the machine learning module 308. In other embodiments, the exposure lock module 302 may use the periodicity of the wiper control signal to confirm the frequency of blackouts generated by the machine learning module 308. Accordingly, in various embodiments, the exposure lock module 302 may optionally modify the vision sensor command 103 further as a function of the wiper control signal. A command driver module 312 may convert the vision sensor command 103 to meet appropriate signal specifications (e.g., voltage swing) for supplying it to the camera circuitry 106.

The camera module 304 may include a conventional sensing and converting module 314, that obtains the sensed light and edges (also referred to herein as sensed information) from an aperture of the camera 118 and converts the sensed information into electrical signals for processing. A conventional camera data generation module 316 may generate the frames of camera data 105 as a function of the converted sensed information.

In various embodiments, an enhanced frame generation module 318 may receive the vision sensor command 103 and utilize it to control exposure values on select frames of camera data, such as, via an exposure control circuit 120, to generated therefrom the enhanced frames 109. In an example, the enhanced frame generation module 318 may, responsive to the vision sensor command 103 (a) predict a blackout; and, (b) hold, for the predicted blackout, a respective exposure value to an exposure value of an immediately preceding frame, wherein the hold has been calibrated for a duration of time that is as long as the frame. Said differently, the hold is a proactive strategy because it represents a predicted blackout, both in time and duration, based on a periodicity of blackouts that is embedded in the vision sensor command 103. Further, the enhanced frame generation module 318 may generate the herein described enhanced frame data 109 by repeating (a) and (b). Enhanced frames 109 are image stabilized because they have flicker and artifacts mitigated, as described herein.

The camera module 304 may supply the enhanced frame data 109 to a mobile platform module that is external to the vision sensing system, wherein the mobile platform module that is external to the vision sensing system is one of the central platform controller 114, the infotainment module 112 and the onboard object recognition module 116. In various embodiments, the camera module 304 supply the enhanced frame data 109 to each of: the central platform controller 114, the infotainment module 112 and the onboard object recognition module 116.

Figure 4:
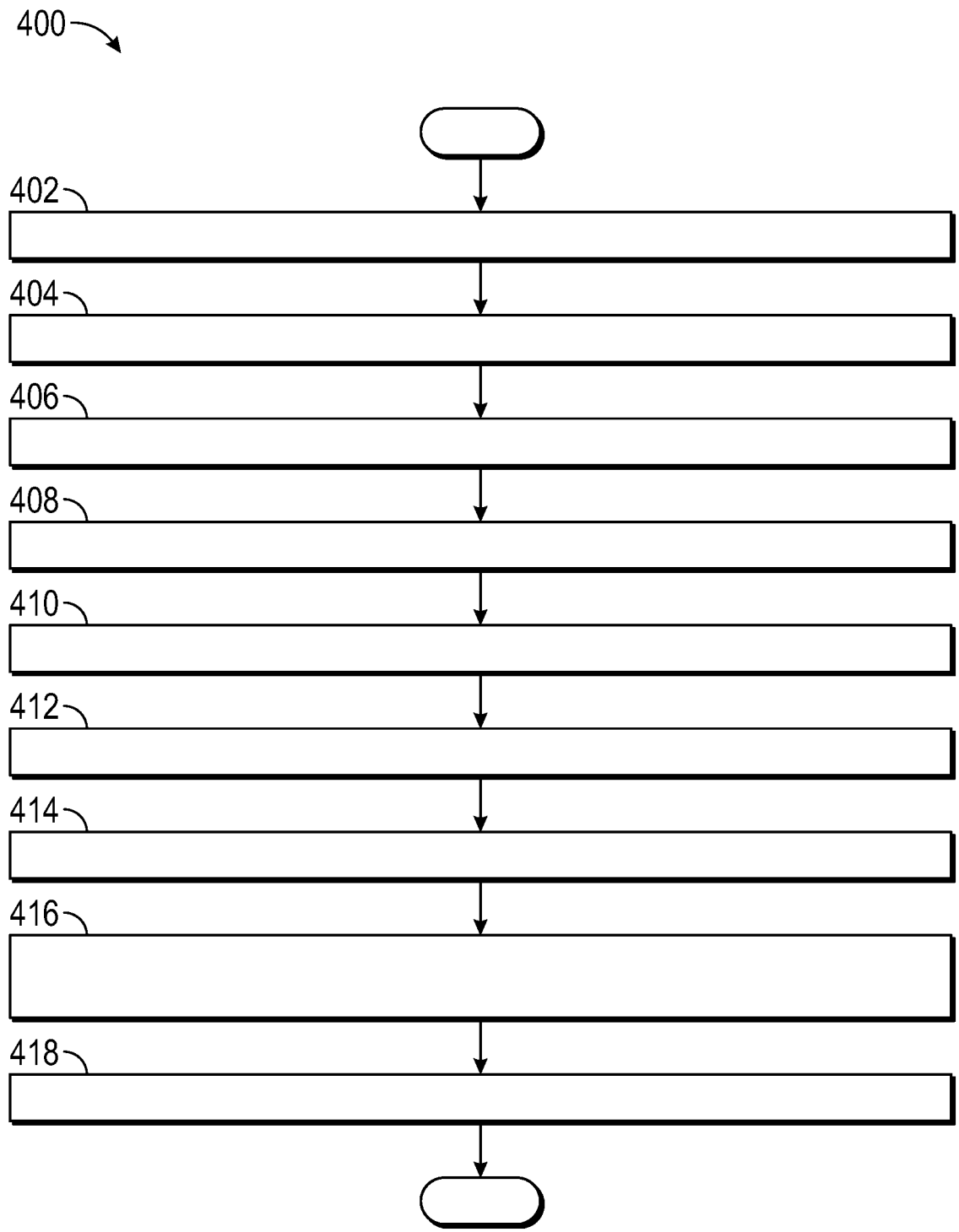
FIG. 4 is a process flow chart depicting an example method for vision sensing in a mobile platform, in accordance with various embodiments.

Turning now to FIG. 4, the system 102 described above may be implemented by a processor-executable method for vision sensing, shown generally as method 400. For illustrative purposes, the following description of method 400 may refer to elements mentioned above in connection with FIGS. 1-3. In practice, portions of method 400 may be performed by different components of the described system 102. It should be appreciated that method 400 may include any number of additional or alternative operations and tasks, the tasks shown in FIG. 3 need not be performed in the illustrated order, and method 400 may be incorporated into a more comprehensive procedure or method having additional functionality not described in detail herein. Moreover, one or more of the tasks shown in FIG. 3 could be omitted from an embodiment of the method 400 as long as the intended overall functionality remains intact.

At 402, the system 102 is initialized. When implemented as an enhanced computer system (e.g., FIG. 1), initialization at 402 may comprise uploading, installing, or updating the instructions constituting the program 56 and preprogrammed variables for execution by the processor 50. At camera circuitry onboard the mobile platform, operation of a camera onboard the mobile platform is controlled, and camera data is generated therefrom, wherein the camera data comprises a sequential plurality of frames;

At 404, camera data is received by exposure lock circuitry 104. At 406, camera data is analyzed to identify a blackout, and machine learning is employed to quantify a frequency of blackouts. As alluded to, a frequency of blackouts may integrate two or more periodic signals (see, FIG. 5, wiper frequency causing blackout 508, having a first period 514 and a second period 516). At 408, generating a vision sensor command 103 for anticipating future blackouts as a function of the frequency of blackouts is performed at the exposure lock circuitry 104.

At 410, optionally, if a wiper control signal is received, the frequency of blackouts may be modified with it. At 412, the vision sensor command is supplied to camera circuitry 106. In some embodiments, after 412, the method ends.

In various embodiments, from 412, the supplied vision sensor command 103 is received and further processed in the camera circuitry 106, as shown in 414-418. At the exposure control circuit 120, a future blackout is predicted as a function of the vision sensor command 103 (at 414) and, (at 416) the vision sensor command 103 is used for holding the exposure value during the predicted blackout. The holding is for a calibrated amount of time, and at an exposure value of an immediately preceding frame. At 418, enhanced frames 109 may be generated and supplied to one or more modules external to the vision sensing system 102.

FIG. 5 is provided to illustrate some of the concepts developed herein. The wiper controller signal 502 is graphed on the Y axis and the passage of time 550 is the X axis. In the illustration, the wiper controller is activated during "on" cycles 506 and deactivated during "off" cycles 504. The occlusion of the aperture on the camera 118 is detected as the wiper frequency causing blackout 508. There is a first blackout 510, with a duration 518, and a periodicity or frequency of blackout 514. There is a second blackout 512, with a duration 520, and a periodicity 516. Various embodiments are capable of detecting two or more blackout frequencies, as shown in FIG. 5. In between the blackouts, a vision signal is present 522.

The camera data 105 exposure values 524 are graphed on the Y axis and frames 552 (sequential frames, which are a function of time) are graphed on the X axis. In this scenario, the camera 118 is initially detecting ambient light and using an exposure value 526, which is an appropriate exposure value for the ambient light. When the wiper blade occludes the aperture of the camera 118, it causes an abrupt blackout 510 (and 512) of ambient light and the camera circuitry may respond by maximizing the exposure value 528 (and 530). When the occlusion/blackout ends, the ambient light returns through the aperture of the camera, and the camera circuitry takes a finite and measurable amount of time 540 to react to the detected return of the ambient light.

The vision sensing system 102 quantifies the frequency of the blackouts (and hence, the periodicity), referring to a first period 514 and a second period 516. The vision sensing system 102 quantifies the associated durations 518 and 520. These quantifications are embodied in the vision sensing command 103, which can be used for predicting blackouts. As shown in the bottom graph of exposure values resulting from the exposure lock controller 532 during the elapse of time, represented as sequential frames 552, the exposure values are held steady (e.g., to the exposure value of an immediately previous frame, in the example, at exposure value 534) for the duration of the blackouts. By using the exposure values resulting from the exposure lock controller 532 during the elapse of time, represented as sequential frames 552, embodiments, generate enhanced frames 109, exhibiting mitigated flicker (536, 538) and mitigated associated artifacts (542), as shown.

Thus, the provided system 102 and method 400 provide a technological solution to the technical problems of flicker and artifacts. The provided system 102 and method 400 identify a periodicity of the blackouts and generate a vision sensor command to predict blackouts based on the identified periodicity, both in frequency and duration. By predicting blackouts, exemplary embodiments can proactively hold exposure values steady (e.g., to a previous frame exposure value, which is an appropriate exposure value for ambient light) on each occurrence of a blackout and for the duration of the frame, to avert flicker and associated artifacts. Exemplary embodiments can supply, as output, enhanced frames, in which the flicker and artifacts have been mitigated as a function of the vision sensing command. Applications and modules that rely on camera data can receive the enhanced frames instead and may experience reduced latency of object detection when using the enhanced frames.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. Various changes can be made in the function and arrangement of elements without departing from the scope of the disclosure as set forth in the appended claims and the legal equivalents thereof.

What is claimed is:

1. A vision sensing system on a mobile platform, comprising:
a camera module configured to control operation of a camera onboard the mobile platform and generate camera data therefrom, wherein the camera data comprises a sequential plurality of frames;
an exposure lock module configured to:
communicate with the camera module to receive the camera data;
analyze the camera data to identify a blackout;
utilize machine learning to quantify a frequency of blackouts in the camera data;
generate a vision sensor command for anticipating future blackouts as a function of the frequency of blackouts; and
supply the vision sensor command to the camera module.

2. The vision sensing system of claim 1, wherein the camera data further comprises, for each frame, a respective exposure value that is a function of sensed light by the camera, and wherein the exposure lock module is further configured to:
identify the blackout as a frame in the camera data in which the respective exposure value is a maximum value; and
cache a preprogrammed number of frames of the camera data to utilize the machine learning to quantify the frequency of blackouts on the camera data.

3. The vision sensing system of claim 2, wherein the camera module is further configured to:
(a) predict a blackout, responsive to the vision sensor command; and
(b) hold, for the predicted blackout, its respective exposure value to an exposure value of an immediately preceding frame.

4. The vision sensing system of claim 3, wherein the camera module is further configured to:
generate enhanced frame data by repeating (a) and (b); and
supply the enhanced frame data to a mobile platform module that is external to the vision sensing system.

5. The vision sensing system of claim 4, wherein the mobile platform module that is external to the vision sensing system is one of an onboard object recognition module or infotainment module.

6. The vision sensing system of claim 1, wherein the camera data further comprises, for each frame, a respective exposure value that is a function of sensed light by the camera, and wherein the exposure lock module is further configured to:
identify the blackout as a frame in which an exposure is a maximum value; and
utilize a machine learning module to:
cache a predetermined number of frames of camera data;
determine a current frequency of blackouts in the cached camera data;
compare the current frequency of blackouts with a previously determined frequency of blackouts to obtain an error between them; and
repeat the caching, determining, and comparing until the error is less than a preprogrammed error threshold; and
supply the frequency of blackouts only when the error is less than the preprogrammed error threshold.

7. The vision sensing system of claim 6, wherein the exposure lock module is further configured to:
receive a wiper control signal from a wiper controller onboard the mobile platform; and
generate the vision sensor command further as a function of the wiper control signal.

8. A method for vision sensing on a mobile platform, comprising:
at camera circuitry onboard the mobile platform, controlling operation of a camera onboard the mobile platform and generating camera data therefrom, wherein the camera data comprises a sequential plurality of frames;
at exposure lock circuitry,
communicating with the camera circuitry to receive the camera data;
analyzing the camera data to identify a blackout;
employing machine learning to quantify a frequency of blackouts in the camera data;
generating a vision sensor command for anticipating future blackouts as a function of the frequency of blackouts; and
supplying the vision sensor command to the camera module.

9. The method for vision sensing of claim 8, wherein the camera data further comprises, for each frame, a respective exposure value that is a function of sensed light by the camera, and further comprising, at the exposure lock circuitry:
identifying the blackout as a frame in the camera data in which the respective exposure value is a maximum value; and
caching a preprogrammed number of frames of the camera data to utilize the machine learning to quantify the frequency of blackouts on the camera data.

10. The method for vision sensing of claim 9, further comprising, at the camera circuitry:
(a) predicting a blackout, responsive to the vision sensor command; and
(b) holding, for the predicted blackout, its respective exposure value to an exposure value of an immediately preceding frame.

11. The method for vision sensing of claim 10, further comprising, at the camera circuitry:
generating enhanced frame data by repeating (a) and (b); and
supplying the enhanced frame data to a mobile platform module that is external to the vision sensing system.

12. The method for vision sensing of claim 11, wherein the mobile platform module that is external to the vision sensing system is one of an onboard object recognition module or infotainment module.

13. The method for vision sensing of claim 8, wherein the camera data further comprises, for each frame, a respective exposure value that is a function of sensed light by the camera, and further comprising, at the exposure lock circuitry:
identifying the blackout as a frame in which an exposure is a maximum value; and
employing a machine learning module to:
cache a predetermined number of frames of camera data;
determine a current frequency of blackouts in the cached camera data;
compare the current frequency of blackouts with a previously determined frequency of blackouts to obtain an error between them; and
repeat the caching, determining, and comparing until the error is less than a preprogrammed error threshold; and supplying the frequency of blackouts only when the error is less than the preprogrammed error threshold.

14. The method for vision sensing of claim 13, wherein the exposure lock module is further configured to:
receive a wiper control signal from a wiper controller onboard the mobile platform;
determine a periodicity of the wiper control signal;
confirm the frequency of blackouts based on the periodicity of the wiper control signal; and
generate the vision sensor command further as a function of the wiper control signal.

15. A vision sensing system for a mobile platform, comprising:
a camera circuit comprising a camera and configured to sense light emitted by objects external to the vehicle and generate camera data therefrom, the camera data comprising a sequential plurality of frames; and
a processor operationally coupled to the camera circuit and configured by programming instructions to:
receive the camera data;
utilize machine learning to quantify a frequency of blackouts in the camera data;
generate a vision sensor command for anticipating future blackouts as a function of the frequency of blackouts; and
supply the vision sensor command to the camera module.

16. The vision sensing system of claim 15, wherein the processor is further configured to:
(a) predict a blackout, responsive to the vision sensor command; and
(b) perform exposure value control by causing the camera circuit to hold, for a duration of the predicted blackout, a respective exposure value to an exposure value of an immediately preceding frame.

17. The vision sensing system of claim 16, wherein the processor is further configured to:
cause the camera circuit to generate enhanced frame data by repeating (a) and (b); and
supply the enhanced frame data to a mobile platform module that is external to the vision sensing system.

18. The vision sensing system of claim 17, wherein the camera data further comprises, for each frame, a respective exposure value that is a function of sensed light by the camera, and wherein the processor is further configured to:
identify the blackout as a frame in which an exposure is a maximum value; and
utilize a machine learning module to:
cache a predetermined number of frames of camera data;
determine a current frequency of blackouts in the cached camera data;
compare the current frequency of blackouts with a previously determined frequency of blackouts to obtain an error between them; and
repeat the caching, determining, and comparing until the error is less than a preprogrammed error threshold; and
supply the frequency of blackouts only when the error is less than the preprogrammed error threshold.

19. The vision sensing system of claim 18, wherein the processor is further configured to:
receive a wiper control signal from a wiper controller onboard the mobile platform;
determine a periodicity of the wiper control signal;
confirm the frequency of blackouts based on the periodicity of the wiper control signal; and
generate the vision sensor command further as a function of the wiper control signal.

20. The vision sensing system of claim 19, wherein the mobile platform module that is external to the vision sensing system is one of an onboard object recognition module or infotainment module.

* * * * *